(12) United States Patent
Okuda

(10) Patent No.: US 9,019,419 B2
(45) Date of Patent: Apr. 28, 2015

(54) LENS APPARATUS AND IMAGE PICKUP APPARATUS

(71) Applicant: Canon Kabushiki Kaisha, Tokyo (JP)

(72) Inventor: Toshihiro Okuda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 53 days.

(21) Appl. No.: 13/963,116

(22) Filed: Aug. 9, 2013

(65) Prior Publication Data

US 2014/0043520 A1   Feb. 13, 2014

(30) Foreign Application Priority Data

Aug. 9, 2012   (JP) ................................ 2012-176871

(51) Int. Cl.
G02B 13/16 (2006.01)
H04N 5/225 (2006.01)
G02B 7/04 (2006.01)

(52) U.S. Cl.
CPC ........................................ G02B 7/04 (2013.01)

(58) Field of Classification Search
USPC .................................. 348/335, 340, 350, 352
See application file for complete search history.

(56) References Cited

U.S. PATENT DOCUMENTS

2009/0066829 A1* 3/2009 Iwasaki .......................... 348/340
2010/0002316 A1* 1/2010 Nomura ......................... 359/817

FOREIGN PATENT DOCUMENTS

JP   2002-267919 A   9/2002
JP   2007-101634 A   4/2007

* cited by examiner

*Primary Examiner* — Yogesh Aggarwal
(74) *Attorney, Agent, or Firm* — Rossi, Kimms & McDowell LLP

(57) ABSTRACT

The lens apparatus includes a first member having a first cam, a second member having a first cam follower engaging with the first cam and a second cam follower, which rotates in a circumferential direction and is moved in an optical axis direction by the first cam, a third member provided with a second cam engaging with the second cam follower and rotating the second member, and biasing members generating between the first and second members a biasing force in a direction oblique to the optical axis direction. The biasing force presses the first and second cam followers respectively against the first and second cams. A biasing force generation direction changes with rotation of the second member, and the biasing force presses the first and second cam followers respectively against same cam surfaces of the first and second cams in an entire second member rotation range.

5 Claims, 4 Drawing Sheets

WIDE

MIDDLE

LENS APPARATUS AND IMAGE PICKUP APPARATUS

BACKGROUND OF THE INVENTION

1. Field of the Invention

The present invention relates to a lens apparatus provided with a mechanism to move a lens in an optical axis direction and interchangeable with respect to or integrated with an image pickup apparatus.

2. Description of the Related Art

Lens apparatuses used for image pickup apparatuses such as single-lens reflex cameras are provided with a mechanism to move a lens (and a lens holding member holding the lens) in an optical axis direction for variation of magnification or focusing. Such a mechanism includes a clearance gap for enabling smooth movement of the lens. However, change of a direction in which the clearance gap narrows with change of posture of the image pickup apparatus including the lens apparatus may cause change of optical performance of the lens apparatus. Therefore, a countermeasure is required which prevents the direction in which the clearance gap narrows from changing with the change of the posture of the image pickup apparatus.

Japanese Patent Laid-Open Nos. 2002-267919 and 2007-101634 disclose a mechanism that always biases one of two members with a spring so as to press it against the other member. Specifically, the mechanism disclosed in Japanese Patent Laid-Open No. 2002-267919 includes a spring provided between two lens holding members movable in an optical axis direction such that the spring extends in a direction oblique to the optical axis direction and a biasing force generated by the spring presses cam followers provided in the two lens holding members against one side cam surfaces of two cam groove portions formed in a cam ring. On the other hand, the mechanism disclosed in Japanese Patent Laid-Open No. 2007-101634 includes a coil spring wound about an axis parallel to an optical axis direction and twisted such that a rotational biasing force generated by the twisted coil spring in a plane orthogonal to the optical axis direction presses a nut provided in a lens holding member against a lead screw formed on an output shaft of a motor.

The mechanism disclosed in Japanese Patent Laid-Open No. 2002-267919 provides a sufficient pressing function when the two lens holding members are only movable in the optical axis direction without rotating about an optical axis. However, when one of the two lens holding member is rotatable with respect to the other lens holding member about the optical axis, rotation of the one lens holding member changes a generation direction of the biasing force of the spring extending in the direction oblique to the optical axis direction. Moreover, as disclosed in Japanese Patent Laid-Open No. 2007-101634, even though the spring is used which generates the rotational biasing force by being twisted about the optical axis, the rotation of the one lens holding member changes a twisted amount of the spring, which results in change of strength of the rotational biasing force. Such change of the direction and strength of the biasing force may provide insufficient pressing and thereby may change optical performance with posture change.

BRIEF SUMMARY OF THE INVENTION

The present invention provides a lens apparatus including a mechanism in which one lens holding member is moved in an optical axis direction with respect to another lens holding member with rotation thereof about an optical axis and capable of suppressing change of optical performance due to posture change.

The present invention provides as one aspect thereof a lens apparatus including a first member holding a first lens and provided with a first cam, a second member holding a second lens and provided with a first cam follower that engages with the first cam and with a second cam follower, the second member rotating with respect to the first member in a circumferential direction around an optical axis and thereby being moved with respect to the first member in an optical axis direction along the optical axis by the first cam, a third member provided with a second cam that engages with the second cam follower and that rotates the second member with respect to the first member in the circumferential direction, and multiple biasing members arranged at multiple places in the circumferential direction and each generating between the first and second members a biasing force in a direction oblique to the optical axis direction, the biasing force pressing the first and second cam followers respectively against with the first and second cams. A biasing force generation direction in which each biasing member generates the biasing force changes with rotation of the second member with respect to the first member. The biasing force generated by each biasing member presses the first and second cam followers respectively against same cam surfaces of the first and second cams in an entire rotation range of the second member.

The present invention provides as another aspect thereof an image pickup apparatus including an image sensor and the above lens apparatus forming an object image on the image sensor.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

[Embodiment 1]

Figure 2:
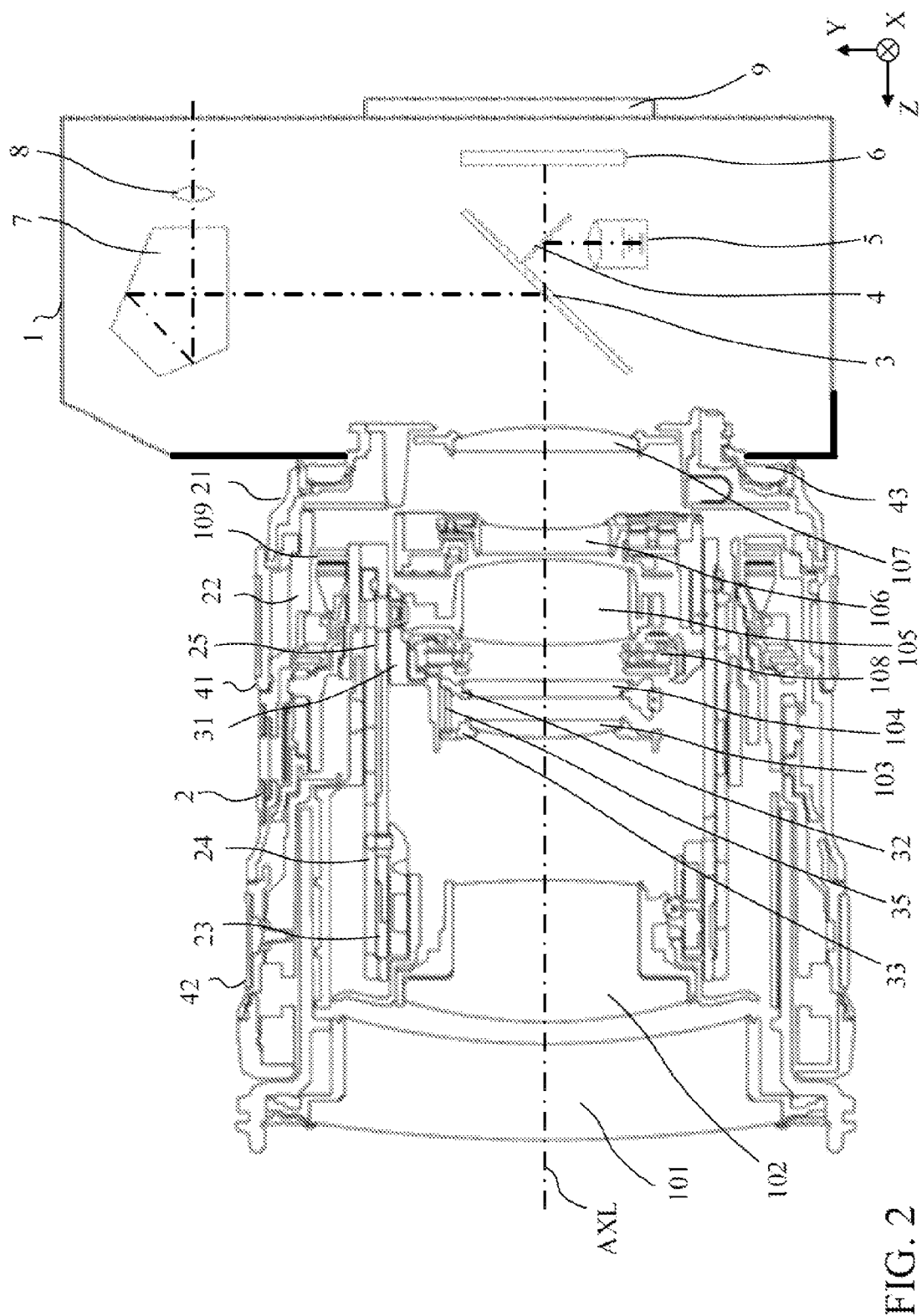
FIG. 2 is a sectional view showing a configuration of an image pickup apparatus to which the interchangeable lens of Embodiment 1 is attached.

FIG. 2 shows a configuration of an interchangeable lens (lens apparatus) that is a first embodiment (Embodiment 1) of the present invention and a configuration of a single-lens reflex digital camera (image pickup apparatus) to which the interchangeable lens is detachably attached. Although this embodiment describes the interchangeable lens that is interchangeable with respect to the image pickup apparatus, embodiments of the present invention include a lens apparatus used for a lens-integrated image pickup apparatus.

In FIG. 2, reference character AXL denotes an optical axis of the interchangeable lens (image capturing optical system). A direction (Z direction) in which the optical axis AXL extends is hereinafter referred to as "an optical axis direction." An X direction and a Y direction are directions orthogonal to the optical axis direction; the X direction is a horizontal direction parallel to a long side of an image pickup surface of an image sensor 6, which will be described later, and the Y direction is a vertical direction parallel to a short side thereof.

Reference numeral 1 denotes a camera body (hereinafter simply referred to as "a camera") of the single-lens reflex digital camera. Reference numeral 2 denotes the interchangeable lens detachably attached to the camera 1.

First, description will be made of the configuration of the camera 1. In FIG. 2, a main mirror 3 is disposed in an optical path of a light flux from the interchangeable lens 2, which reflects part of the light flux to direct it to a viewfinder optical system (7 and 8) and transmits a remaining light flux therethrough.

A sub mirror 4 is disposed behind (further on an image plane side than) the main mirror 3, which reflects the light flux transmitted through the main mirror 3 to direct it to a focus detection unit 5. The main and sub mirrors 3 and 4 are integrally movable into and out of the optical path by a mirror drive mechanism (not shown).

The focus detection unit 5 performs focus detection (detection of a focus state of the image capturing optical system) by a phase difference detection method. On a basis of results of the focus detection, a focus drive unit 109 (described later) provided in the interchangeable lens 2 is controlled to perform autofocus (AF).

The image sensor 6 is constituted by a CCD sensor or a CMOS sensor. The light flux from the image capturing optical system forms an optical image (object image) on a light-receiving surface (image pickup surface) of the image sensor 6. The image sensor 6 photoelectrically converts the object image to output an image pickup signal. A signal processor (not shown) performs various processes on the image pickup signal to produce an image signal.

Reference numeral 9 denotes a display panel, which displays the image signal output from the signal processor and various information on image capturing.

The camera 1 thus configured performs photometry and the AF in response to a half-press operation of an image capturing button (not shown) by a user and performs an image capturing operation in response to a full-press operation of the image capturing button to produce a recording image and record it to a recording medium (not shown) such as a semiconductor memory.

Next, description will be made of the configuration of the interchangeable lens 2. The image capturing optical system includes, in order from an object side to the image plane side, a first lens unit 101, a second lens unit 102, a third lens unit 103, a fourth lens unit 104, a fifth lens unit 105, a sixth lens unit 106 and a seventh lens unit 107. An aperture stop unit 108, which constitutes part of the image capturing optical system, is disposed between the fourth and fifth lens units 104 and 105.

The second lens unit 102 constitutes a focus lens unit with a second lens barrel (no reference numeral is shown) that holds the second lens unit 102. The focus lens unit receives a driving force from the focus drive unit 109 (described later) and thereby is moved in the optical axis direction with rotation thereof in a circumferential direction about the optical axis with respect to a guide barrel 23 and a cam barrel 24 (both described later) to perform focusing. The focus drive unit 109 is constituted by a vibration type motor (no reference numeral is shown) as a driving source, a focus operation ring 42 and a key member (not shown) that is rotated by the vibration type motor and the focus operation ring 42 in the circumferential direction to rotate the focus lens unit.

The cam barrel 24 is provided with a focus cam groove portion (no reference numeral is shown) with which a focus cam follower provided in the focus lens unit engages. Thus, the focus lens unit rotating with respect to the cam barrel 24 in the circumferential direction is moved in the optical axis direction by the focus cam groove portion.

The sixth lens unit 106 receives a driving force from an image stabilization unit (not shown) to be shifted in the X and Y directions orthogonal to the optical axis to perform image stabilization (image blur correction). The aperture stop unit 108 controls an amount of light passing through the image capturing optical system and reaching the image sensor 6.

Reference numeral 21 denotes an exterior ring, which is fixed to a mount 43 that is detachably attachable to the camera 1. Reference numeral 22 denotes a fixed barrel, which is fixed to the exterior ring 21. The guide barrel 23, which corresponds to a third member, is provided with a second cam groove portion 23a and a third straight groove portion 23b (both described later).

The came ring 24, which corresponds to a fourth member, is provided with a third cam groove portion (described later) in addition to the above-mentioned focus cam groove portion. The cam barrel 24 is held rotatably around an outer circumference of the guide barrel 23 in the circumferential direction. Reference numeral 41 denotes a zoom operation ring, which is rotationally operated by the user to rotate the cam barrel 24.

Next, description will be made of a rear lens unit including the third and fourth lens units 103 and 104 and of a mechanism to move the rear lens unit in the optical axis direction with reference to FIGS. 2 and 3. Reference numeral 31 denotes a rear base barrel, which is provided with a third cam follower 25 and a first cam groove portion 31a. The rear base barrel 31 holds a third lens barrel 33 holding the third lens unit 103. In other words, the rear base barrel 31 holds the third lens unit 103 through the third lens barrel 33 disposed therebetween. The rear base barrel 31 and the third lens barrel 33 constitute a first member which is a lens holding member that holds the third lens unit 103 corresponding to a first lens.

The third cam follower 25 engages with the above-mentioned third straight groove portion 23b formed in the guide barrel 23 so as to extend in the optical axis direction and with the third cam groove portions 24a formed in the cam barrel 24. The third cam follower 25 is moved in the optical axis direction by movement of an intersection of the third cam groove portion 24a and the third straight groove portion 23b. The movement of the third cam follower 25 moves the rear base barrel 31 (that is, the third and fourth lens units 103 and 104).

Reference numeral 32 denotes a fourth lens barrel, which corresponds to a second member and is a lens holding member that holds the fourth lens unit 104 corresponding to a second lens. The fourth lens barrel 32 is provided with a first cam follower 36 that engages with the first cam groove portion 31a provided in the rear base barrel 31 and with a second cam follower 37 that engages with the above-mentioned second cam groove portion 23a provided in the guide barrel 23. The fourth lens barrel 32 is held movably in the optical axis direction by the rear base barrel 31.

Therefore, rotation of the cam barrel 24 moves the fourth lens barrel 32 in the optical axis direction with the rear base barrel 31 (third lens barrel 33). Moreover, with this movement of the rear base barrel 31 in the optical axis direction, the fourth lens barrel 32 is rotated with respect to the rear base barrel 31 in the circumferential direction by the second cam groove portion 23a provided in the guide barrel 23 through the second cam follower 37. Furthermore, with this rotation of the fourth lens barrel 32, the fourth lens barrel 32 is moved in the optical axis direction by the first cam groove portion 31a provided in the rear base barrel 31 through the first cam follower 36.

Thus, the third lens barrel 33 (third lens unit 103) and the four lens barrel 32 (fourth lens unit 104) are moved in the optical axis direction with changing a distance therebetween to perform the variation of magnification.

In order to allow smooth movement of the first cam follower 36 along the first cam groove portion 31a, a predetermined clearance gap is provided between the first cam follower 36 and both inner surfaces (a cam surface and a surface opposite thereto) of the first cam groove portion 31a. Therefore, in this embodiment, a biasing mechanism is provided in order to prevent backlash of the first cam follower 36 with respect to the first groove portion 31a due to the clearance gap.

The fourth lens barrel 32 is provided with a spring hooking portion 32a on which one end of a tension spring 35 (such as a tension coil spring or any one of springs generating a tensional force) as a biasing member is hooked. On the other hand, the third lens barrel 33 is provided with a spring hooking portion 33a on which another end of the tension spring 35 is hooked. The tension spring 35 is disposed (hung) between the third and fourth lens barrel 33 and 32 so as to generate a biasing force as a tensional force in a direction oblique to the optical axis direction.

Figure 3:
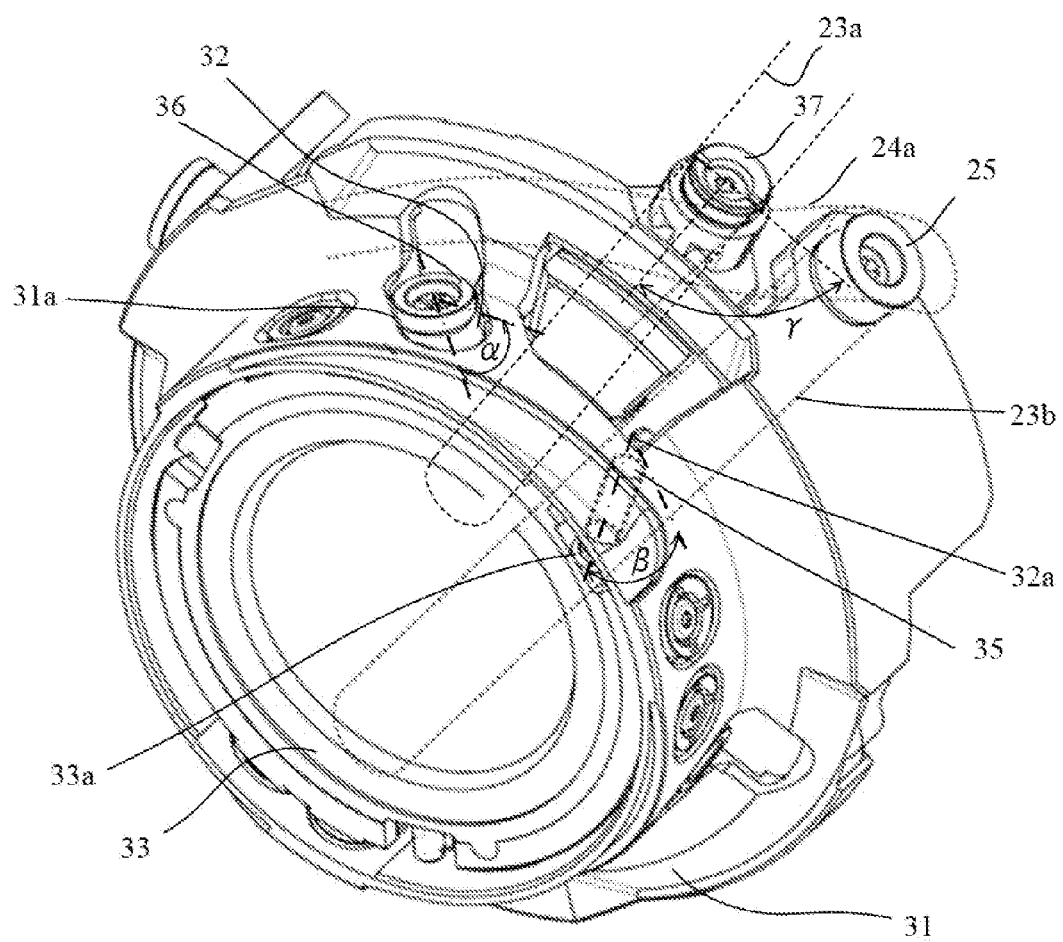
FIG. 3 is a partial perspective view showing the lens barrel configuration of the interchangeable lens shown in FIG. 2.

FIG. 3 shows an angle $\alpha$ of a direction in which the first cam groove portion 31a extends (that is, a longitudinal direction or a lead direction of the first cam groove portion 31a) with respect to an XY plane orthogonal to the optical axis direction and an angle $\beta$ of a spring longitudinal direction of the tension spring 35 (that is, a biasing force generation direction in which the biasing force is generated in the tension spring 35) with respect to the XY plane. Moreover, FIG. 3 shows an angle $\gamma$ of a longitudinal direction (lead direction) of the second cam groove portion 23a with respect to the XY plane. Since the biasing force generation direction is oblique to the optical axis direction, a component force of the biasing force generated by the tension spring 35, which is a component force parallel to the XY plane and hereinafter referred to as "a rotational component force", becomes a force that rotates the fourth lens barrel 32 with respect to the rear base barrel 31 in the circumferential direction. This rotational component force presses the first and second cam followers 36 and 37 provided in the fourth lens barrel 32 respectively against the cam surfaces of the first and second cam groove portions 31a and 23a.

Figure 1A:
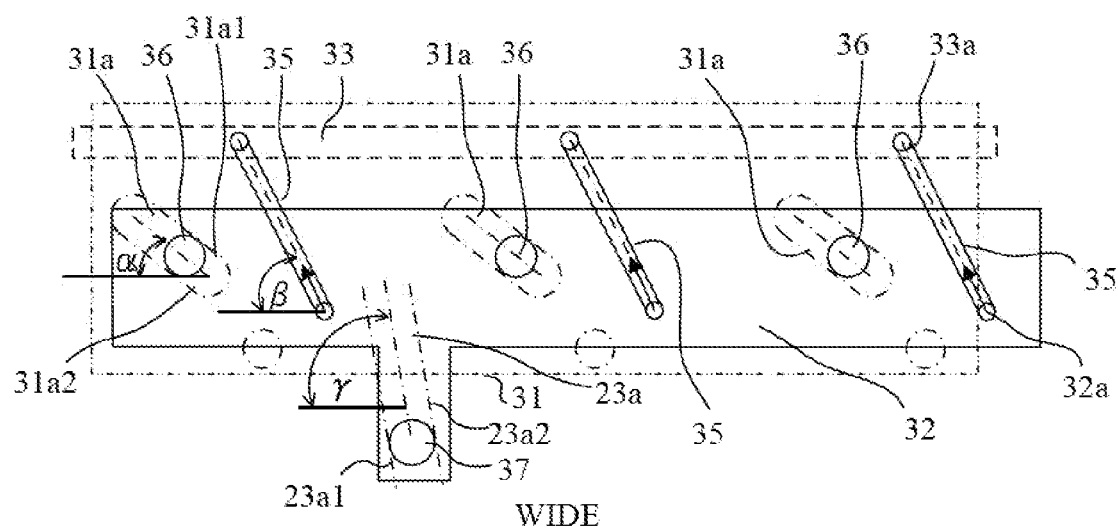
FIGS. 1A to 1C are developed views showing a lens barrel configuration of an interchangeable lens that is Embodiment 1 of the present invention.
Figure 1B:
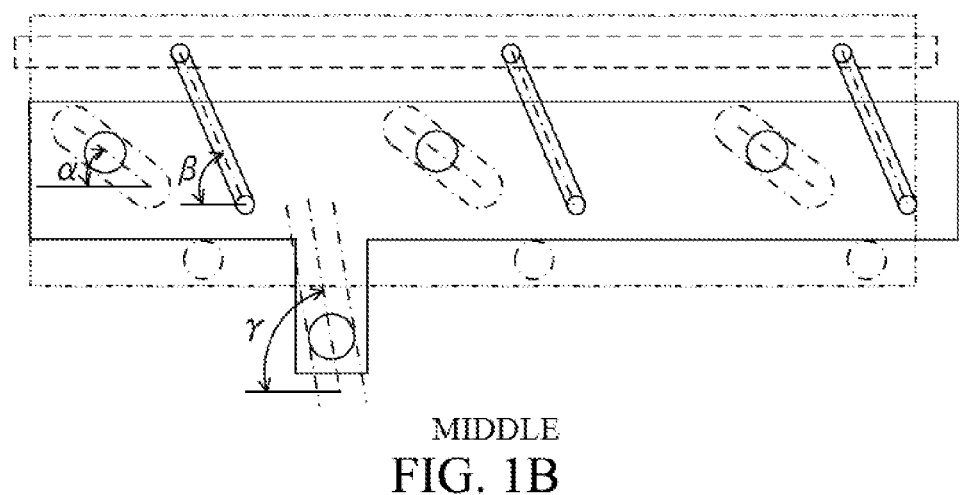
Figure 1C:
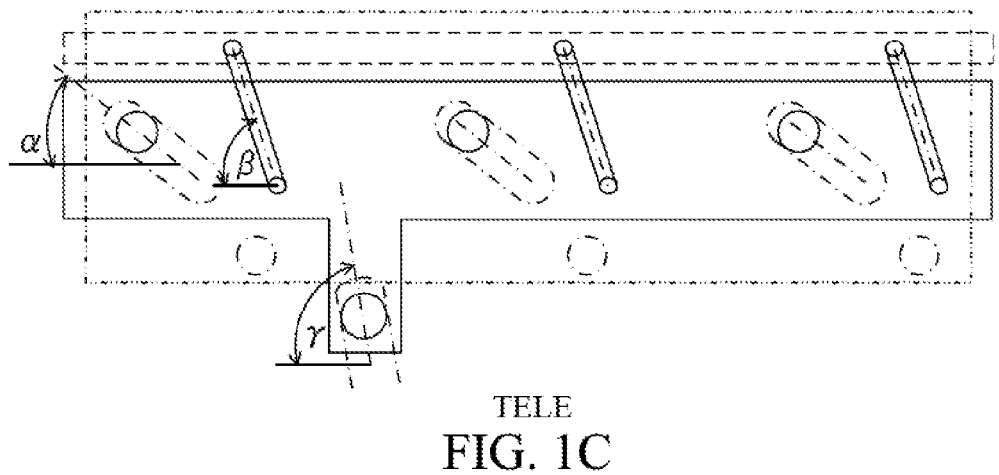

FIGS. 1A, 1B and 1C are circumferentially developed views showing relations of the rear base barrel 31, the third lens barrel 33, the fourth lens barrel 32 and the tension spring 35 at a wide-angle end (WIDE) state, a middle zoom (MIDDLE) state and a telephoto end (TELE) state. A vertical direction in these figures corresponds to the optical axis direction. Multiple tension springs 35 are provided at circumferentially equally-spaced intervals, each being hung between the third and fourth lens barrels 33 and 32 (spring hooking portions 33a and 32a).

As understood from these figures, in an entire rotation range of the fourth lens barrel 32 from the WIDE state to the TELE state (that is, in an entire range of the variation of magnification), the following relation is satisfied:

$$\alpha < \beta < \gamma \quad (1).$$

With the rotation of the fourth lens barrel 32 with respect to the rear base barrel 31 and the third lens barrel 33, the biasing force generation direction of each tension spring 35, that is, the angle $\beta$ changes. However, in the entire rotation range of the fourth lens barrel 32, the rotational component force of the biasing force generated by each tension spring 35 presses the first and second cam followers 36 and 37 respectively against same cam surfaces 31a1 and 23a1 of the first and second cam groove portions 31a and 23a. In other words, the rotational component force of the biasing force does not press the first and second cam followers 36 and 37 respectively against other surfaces 31a2 and 23a2 of the first and second cam groove portions 31a and 23a even in a partial rotation range of the fourth lens barrel 32.

Pressing both the cam followers 36 and 37 respectively against the same cam surfaces 31a1 and 23a1 in the entire range of the variation of magnification enables suppression of change of optical performance (for example, deterioration of smoothness of the variation of magnification) of the interchangeable lens 2 as compared with a case where the cam followers 36 and 37 are pressed respectively against the other cam surfaces 31a2 and 23a2 in a partial range of the variation of magnification. Thus, in this embodiment, although the biasing force generation direction of each tension spring 35 changes with the rotation of the fourth lens barrel 32, the first and second cam followers 36 and 37 can be pressed respectively against the same cam surfaces 31a1 and 23a1 of the first and second cam groove portions 31a and 23a in the entire rotation range of the fourth lens barrel 32. This configuration makes it possible to suppress, even in the above-described lens configuration where the fourth lens barrel 32 is moved in the optical axis direction with rotation thereof with respect to the rear base barrel 31 and the third lens barrel 33 in the circumferential direction, the change of optical performance of the interchangeable lens 2 (and the camera 1) due to change of posture thereof.

Considering a friction coefficient $\mu_1$ between the cam surface 31a1 of the first cam groove portion 31a and the first cam follower 36 and a friction coefficient $\mu_2$ between the cam surface 23a1 of the second cam groove portion 23a and the second cam follower 37, it is desirable that the following relations be satisfied:

$$|\cos(\beta-\alpha)| - |\mu_1 \sin(\beta-\alpha)| > 0$$

$$|\cos(\gamma-\beta)| - |\mu_2 \sin(\gamma-\beta)| > 0 \quad (2).$$

The above-mentioned rotational component force corresponds to a force obtained by subtracting a frictional force generated for a pressing force vertically pressing each cam follower against the cam surface of each cam groove portion from a component force parallel to each cam groove portion. Therefore, satisfying the above relations makes it possible to always press each cam follower against the same cam surface of each cam groove portion with a sufficient biasing force in the entire rotation range of the fourth lens barrel 32.

Moreover, in this embodiment, each tension spring 35 is disposed obliquely to the optical axis direction with a configuration that the tension spring 35 (each end hook thereof) is rotatable about the spring hooking portions 32a and 33a, which enables generation of the biasing force in a direction connecting the spring hooking portions 32a and 33a with a straight line. Hence, it is possible to prevent an unintended biasing force from acting in the rotation direction of the fourth lens barrel 32. Furthermore, the tension spring 35 rotatable about the spring hooking portions 32a and 33a enables increase of the rotation range of the fourth lens barrel 32 as compared with a case of using other springs such as a compression coil spring. As a result, a movable amount of the fourth lens barrel 32 in the optical axis direction can be increased with a same angle α of the lead direction of the first cam groove portion 31a, which enables miniaturization of the interchangeable lens 2 and increase of a variable magnification ratio thereof.

Although this embodiment described the case where the first and second cam groove portions 31a and 23a are each a linear cam, these cams may be a nonlinear cam. In this case, although the angles α and γ change with the rotation of the fourth lens barrel 32, it is only necessary to dispose the tension springs 35 such that the relations (1) and (2) are satisfied.

[Embodiment 2]

Figure 4:
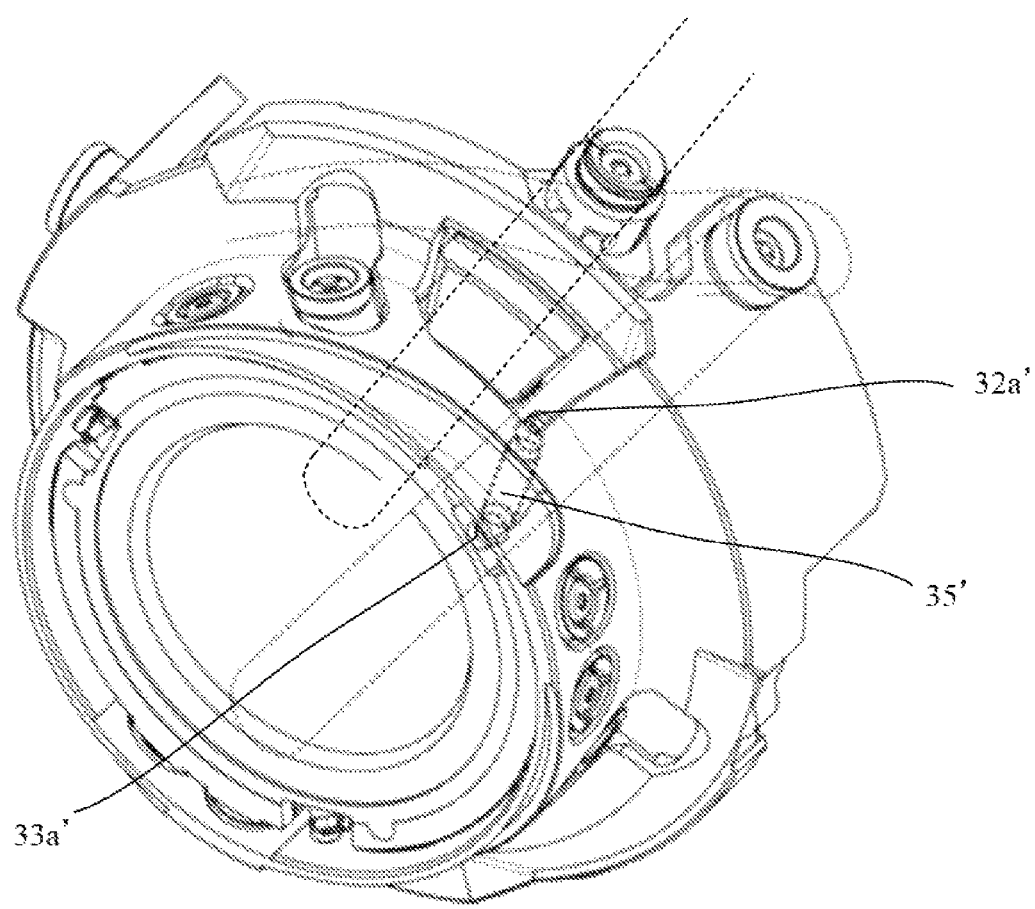
FIG. 4 is a partial perspective view showing a lens barrel configuration of an interchangeable lens that is Embodiment 2 of the present invention.

FIG. 4 shows a lens barrel that is a second embodiment (Embodiment 2) of the present invention. Although Embodiment 1 uses the tension spring 35 as the biasing member, Embodiment 2 uses a compression spring 35' (such as a compression coil spring or any one of springs generating a restoring force by compression thereof) as the biasing member. Spring receiving portions 32a' and 33a' are provided in the fourth and third lens barrels 32 and 33 in place of the spring hooking portions 32a and 33a provided in Embodiment 1.

Also in this embodiment, multiple compression springs 35' are provided at multiple places in the circumferential direction so as to each generate the restoring force by compression thereof as a biasing force in a direction oblique to the optical axis direction. In addition, although a biasing force generation direction of each compression spring 35' changes with the rotation of the fourth lens barrel 32, the first and second cam followers 36 and 37 are always pressed respectively against the same cam surfaces 31a1 and 23a1 of the first and second cam groove portions 31a and 23a in the entire rotation range of the fourth lens barrel 32.

Moreover, also in this embodiment, it is desirable that the relations (1) and (2) described in Embodiment 1 be satisfied.

As described above, in each of Embodiments 1 and 2, although the biasing force generation direction of the biasing member changes with the rotation of the second member with respect to the first member, the cam follower can be always pressed against the same cam surface of the cam with a sufficient biasing force in the entire rotation range of the second member. Therefore, even in the configuration where the second member is moved in the optical axis direction with the rotation thereof with respect to the first member about the optical axis, a lens apparatus capable of suppressing change of its optical performance due to change of its posture can be achieved.

Furthermore, although each of the above embodiments described the mechanism to move the first and second lens units for the variation of magnification, a similar mechanism to that in Embodiment 1 may be used to move the first and second lens units for focusing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176871, filed on Aug. 9, 2012, which is hereby incorporated by reference herein in its entirety.

What is claimed is:

1. A lens apparatus comprising:
a first member holding a first lens and provided with a first cam;
a second member holding a second lens and provided with a first cam follower that engages with the first cam and with a second cam follower, the second member rotating with respect to the first member in a circumferential direction around an optical axis and thereby being moved with respect to the first member in an optical axis direction along the optical axis by the first cam;
a third member provided with a second cam that engages with the second cam follower and that rotates the second member with respect to the first member in the circumferential direction; and
a plurality of biasing members arranged at a plurality of places in the circumferential direction and each generating between the first and second members a biasing force in a direction oblique to the optical axis direction, the biasing force pressing the first and second cam followers respectively against with the first and second cams,
wherein a biasing force generation direction in which each biasing member generates the biasing force changes with rotation of the second member with respect to the first member, and
wherein the biasing force generated by each biasing member presses the first cam followers against same cam surfaces of the first cams in an entire rotation range of the second member and presses the second cam followers against same cam surfaces of the second cams in the entire rotation range.

2. A lens apparatus according to claim 1, wherein the following relation is satisfied in the entire rotation range of the second member:

$$\alpha < \beta < \gamma$$

where α represents an angle of a longitudinal direction of the first cam with respect to a plane orthogonal to the optical axis direction, β represents an angle of the biasing force generation direction with respect to the plane, and γ represents an angle of a longitudinal direction of the second cam with respect to the plane.

3. A lens apparatus according to claim 1, wherein the following relations are satisfied:

$$|\cos(\beta-\alpha)| - |\mu_1 \sin(\beta-\alpha)| > 0$$

$$|\cos(\gamma-\beta)| - |\mu_2 \sin(\gamma-\beta)| > 0$$

where α represents an angle of a longitudinal direction of the first cam with respect to a plane orthogonal to the optical axis direction, β represents an angle of the biasing force generation direction with respect to the plane, γ represents an angle of a longitudinal direction of the second cam with respect to the plane, $\mu_1$ represents a friction coefficient between the cam surface of the first cam and the first cam follower, and $\mu_2$ represents a friction coefficient between the cam surface of the second cam and the second cam follower.

4. A lens apparatus according to claim 1, wherein each biasing member is constituted by a tension spring.

5. An image pickup apparatus comprising:
an image sensor; and
a lens apparatus forming an object image on the image sensor,
wherein the lens apparatus comprises:
a first member holding a first lens and provided with a first cam;
a second member holding a second lens and provided with a first cam follower that engages with the first cam and with a second cam follower, the second member rotating with respect to the first member in a circumferential direction around an optical axis and thereby being moved with respect to the first member in an optical axis direction along the optical axis by the first cam;

a third member provided with a second cam that engages with the second cam follower and that rotates the second member with respect to the first member in the circumferential direction; and a plurality of biasing members arranged at a plurality of places in the circumferential direction and each generating between the first and second members a biasing force in a direction oblique to the optical axis direction, the biasing force pressing the first and second cam followers respectively against with the first and second cams, wherein a biasing force generation direction in which each biasing member generates the biasing force changes with rotation of the second member with respect to the first member, and wherein the biasing force generated by each biasing member presses the first cam followers against same cam surfaces of the first cams in an entire rotation range of the second member and presses the second cam followers against same cam surfaces of the second cams in the entire rotation range.

* * * * *